US009594381B1

(12) United States Patent
Clark et al.

(10) Patent No.: US 9,594,381 B1
(45) Date of Patent: Mar. 14, 2017

(54) ENHANCED DISTANCE DETECTION SYSTEM

(71) Applicant: Kespry, Inc., Menlo Park, CA (US)

(72) Inventors: Robert Parker Clark, Palo Alto, CA (US); Chang Young Kim, Newark, CA (US)

(73) Assignee: KESPRY, INC., Menlo Park, CA (US)

( * ) Notice: Subject to any disclaimer, the term of this patent is extended or adjusted under 35 U.S.C. 154(b) by 0 days.

(21) Appl. No.: 14/864,508

(22) Filed: Sep. 24, 2015

(51) Int. Cl.
| | |
|---|---|
| *G01C 23/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *G05D 1/10* | (2006.01) |
| *B64C 39/02* | (2006.01) |
| *B64D 47/08* | (2006.01) |
| *G01S 17/08* | (2006.01) |
| *G01S 17/93* | (2006.01) |

(52) U.S. Cl.
CPC ........... *G05D 1/101* (2013.01); *B64C 39/024* (2013.01); *B64D 47/08* (2013.01); *G01S 17/08* (2013.01); *G01S 17/933* (2013.01); *B64C 2201/024* (2013.01); *B64C 2201/108* (2013.01); *B64C 2201/141* (2013.01)

(58) Field of Classification Search
CPC ........ B64D 47/08; G01S 17/08; G01S 17/933
USPC ........................................................... 701/3
See application file for complete search history.

(56) References Cited

U.S. PATENT DOCUMENTS

| | | | |
|---|---|---|---|
| 6,556,282 B2 | 4/2003 | Jamieson et al. | |
| 2003/0043363 A1* | 3/2003 | Jamieson | G01C 23/005 356/5.01 |
| 2011/0304736 A1 | 12/2011 | Evans et al. | |
| 2012/0170029 A1 | 7/2012 | Azzazy et al. | |
| 2014/0336848 A1 | 11/2014 | Saund et al. | |

FOREIGN PATENT DOCUMENTS

| | | |
|---|---|---|
| WO | WO 2015/051616 A1 | 4/2015 |
| WO | WO 2015/102731 A2 | 7/2015 |

OTHER PUBLICATIONS

Elfes, A., Using Occupancy Grids for Mobile Robot Perception and Navigation, Computer, 22(6), pp. 46-57 (Jun. 1989).
Hornung A. et al., OctoMap: an Efficient Probabilistic 3D Mapping Framework Based on Octrees, Auton. Robots, 34(3), pp. 189-206 (Apr. 2013).

(Continued)

*Primary Examiner* — MacEeh Anwari
(74) *Attorney, Agent, or Firm* — Knobbe Martens Olson & Bear LLP (57) ABSTRACT

An enhanced distance detection system for an autonomous or semi-autonomous vehicle is described here. The distance detection system includes a distance detector, which may have a limited scope of distance detection, and a directional controller, which allows extending the dimension or scope of the distance detector as the vehicle travels and performs missions. The directional controller can change the detection direction of the distance detector with a motorized gimbal or functionally similar system, and the change in the detection direction can be integrated with the status of and other instructions executed by the vehicle.

26 Claims, 5 Drawing Sheets

(56) References Cited

OTHER PUBLICATIONS

Massaro R. et al., Lidar Flecks: Modeling the Influence of Canopy Type on Tactical Foliage Penetration by Airborne, Active Sensor Platforms, Proc. SPIE, Airborne Intelligence, Surveillance, Reconnaissance (ISR) Systems and Applications IX, vol. 8360, 836008 (2012).

Peasley, B. et al., Accurate On-Line 3D Occupancy Grids Using Manhattan World Constraints, Intelligent Robots and Systems (IROS), IEEE/RSJ International Conference, pp. 5283-5290 (Oct. 2012).

Roth M. et al. High-Resolution Foliage Penetration with Gimbaled Lidar, Proc. SPI, Laser Radar Technology and Applications XII, vol. 6550, 65500K (2007).

Souza, A. et al., 3D Probabilistic Occupancy Grid to Robotic Mapping with Stereo Vision, Current Advancements in Stereo Vision, InTech (2012).

International Search Report dated Dec. 5, 2016 received in PCT/US2016/052965 filed Sep. 21, 2016.

\* cited by examiner

ENHANCED DISTANCE DETECTION SYSTEM

BACKGROUND

Field

The described technology generally relates to unmanned aerial vehicles and, more specifically, to enhanced distance detection systems of unmanned aerial vehicles.

Description of the Related Art

An unmanned aerial vehicle, also commonly referred to as drone, can travel through a variety of environments, such as indoor, outdoor, and/or mixed indoor and outdoor environments. In some cases, an unmanned aerial vehicle can be configured to conduct surveillance, mapping, delivery, monitoring, or other tasks that can comprise combining movement and data collection. The unmanned aerial vehicle can travel over surfaces on which the unmanned aerial vehicle cannot safely land (e.g., water).

SUMMARY

The methods and devices of the described technology each have several aspects, no single one of which is solely responsible for its desirable attributes.

In one embodiment, an unmanned aerial vehicle includes a distance detector, a directional controller coupled to the distance detector, and one or more processors. The one or more processors are configured to execute a mission of the unmanned aerial vehicle, determine direction priorities based at least in part on current travel instructions of the mission, and acquire and/or process distance data generated by the distance detector based at least in part on the determined direction priorities.

In another embodiment, a method for targeted sensing for an unmanned aerial vehicle includes initiating a mission, determining direction priorities based at least in part on current travel instructions of the mission, controlling an orientation of a distance detector, and acquiring and/or processing distance data from the distance detector based at least in part on the determined direction priorities.

BRIEF DESCRIPTION OF THE DRAWINGS

These drawings and the associated description herein are provided to illustrate specific embodiments of the described technology and are not intended to be limiting.

DETAILED DESCRIPTION

Various aspects of the novel systems, apparatuses, and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass apparatus and/or methods which are practiced using structure and/or functionality in addition to or different than the various aspects specifically set forth herein. It should be understood that any aspect disclosed herein might be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wired and wireless technologies, system configurations, networks, including optical networks, hard disks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The term "autonomous vehicle" or "semi-autonomous vehicle," as used herein, generally refers to a vehicle that is configured to operate without substantial or any involvement from an on-board operator (e.g., a driver or pilot). An "unmanned aerial vehicle," or "UAV," as used herein, can denote a type of autonomous or semi-autonomous vehicle whose physical operational capabilities include aerial travel or flight. An unmanned aerial vehicle can be an aircraft that is configured to take off and land on a surface. In some cases, an unmanned aerial vehicle can automatically travel from one location to another without any operator involvement. In some cases, an unmanned aerial vehicle can travel a far distance from a starting point. The distance can be far enough that the unmanned aerial vehicle cannot return to a starting point without refueling or recharging at an intermediate location. An unmanned aerial vehicle can be configured to land on a landing pad and/or charge at a charging station.

An enhanced distance detection system for an autonomous or semi-autonomous vehicle is described herein. The distance detection system includes a distance detector, which may have a limited scope of distance detection, and a directional controller, which allows extending the dimension or scope of the distance detector as the vehicle travels and performs missions. The directional controller can change the detection direction of the distance detector with a motorized gimbal or functionally similar system, and the change in the detection direction can be integrated with the status of and/or instructions executed or to be executed by the vehicle.

Figure 1:
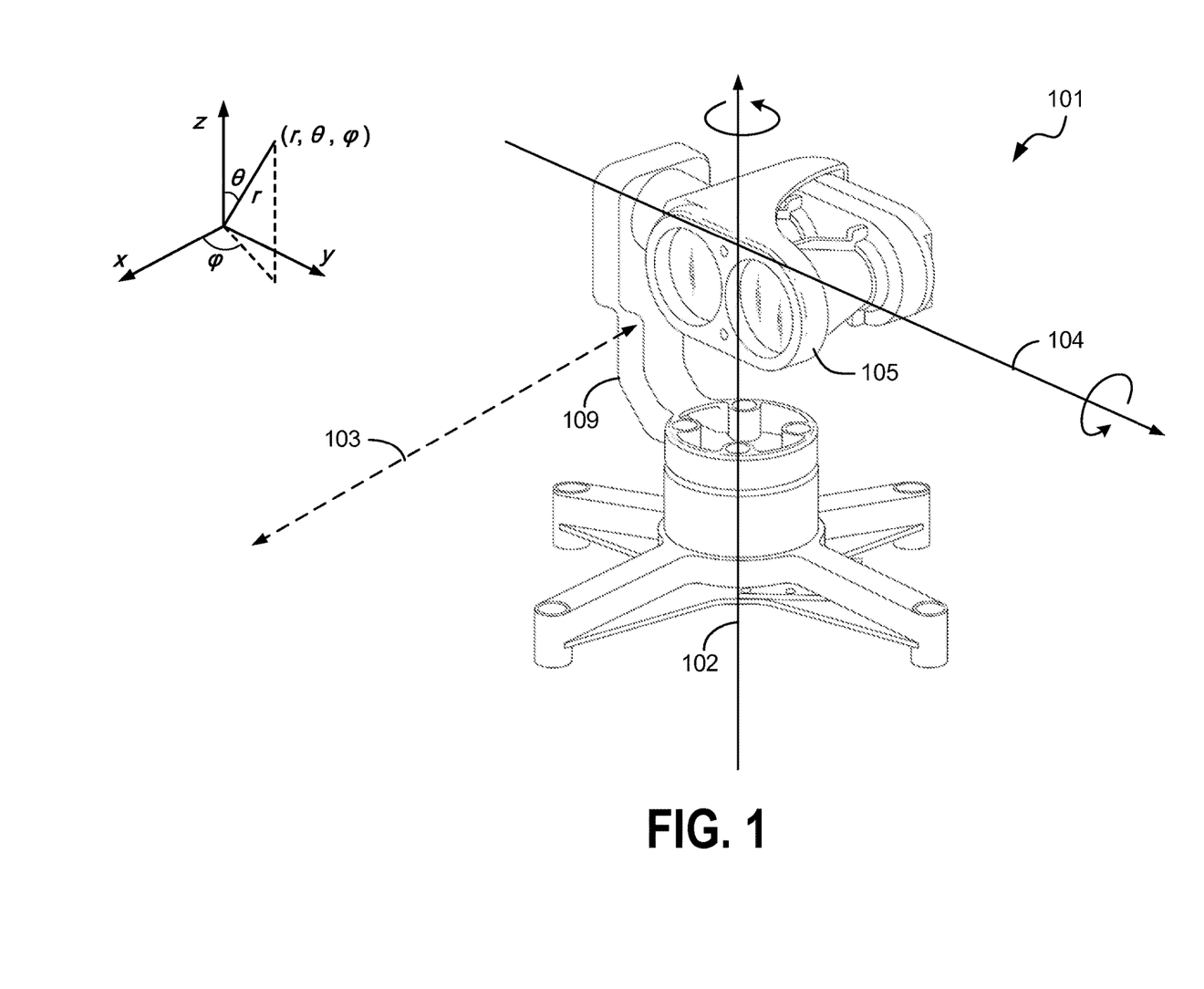
FIG. 1 is a distance detector system according to one embodiment.

FIG. 1 is a distance detector system according to one embodiment. The illustrated distance detector system 101 includes a distance detector 105 and a motorized directional controller 109. Also shown in FIG. 1 are reference Cartesian and spherical coordinates, which are shown only for ease of explanation and are not considered limiting the implementation of the distance detector system 101. In some embodiments the distance detector 105 can be implemented using at least one LIDAR, such as a one-, two-, or three-dimensional LIDAR, which has a field of detection 103. In other embodiments the distance detector 105 can be implemented with technologies using other suitable form of signal or energy, such as radar, structured light, ultrasound, etc. The "field of detection" as used herein generally refers to one or more lines or paths of emission and detection of laser (or any other suitable form of signal or energy for distance detection) from and to the distance detector (e.g., 105) as defined by the orientation and internal configurations native or inherent in the design of the distance detector as one unit. For example, a one-dimensional LIDAR may have one emitter-detector pair side by side pointing at the same direction in parallel, and the field of detection of the one-dimensional LIDAR can be a unit-resolution line defined by a unit-resolution point in the space at which the emitter-detector pair is pointing. A higher dimensional LIDAR may have more than one emitter-detector pair and/or have internal mechanical and/or optical mechanisms to emit and detect radiation in more than one direction. In such a case, the field of detection can be an accumulation of the lines of emission and detection defined by multiple points in the space (e.g., a perimeter of a surface or a surface of a volume).

In some embodiments, the motorized directional controller 109 can be implemented with a generally L-shaped arm gimbal system providing additional degrees of freedom (e.g., in $\theta$ and $\phi$ in FIG. 1) about additional axes 102, 104 to allow expanding upon or augmenting the field of detection 103 native to the distance detector 105. In other embodiments, the gimbal system illustrated in FIG. 1 can be implemented with a different mechanical structure, such as a U-shaped arm, that can similarly provide additional degrees of freedom. The illustrated directional controller 109 includes two hubs allowing the distance detector 105 to rotate about the axes 102 and 104. Rotations about the axes 102 and 104 can be controlled by motors (not shown) and motor controllers (not shown). For example, a brushless motor with a slip ring can be implemented to allow rotations about the axis 102, and another brushless motor can be implemented to allow rotations about the axis 104. In some embodiments, the directional controller 109 can provide continual rotations about one or more of the axes 102, 104, and in other embodiments, the directional controller 109 can provide limited or non-continual rotations about one or more of the axes 102, 104. For example, in certain implementations, the directional controller 109 can allow unlimited rotation about the axis 102 (i.e., unlimited in $\phi$ in FIG. 1) so that the distance detector 105 can rotate about the axis 102 while rotation about the axis 104 may have a range of 180° (e.g., 0° to 180° in $\theta$ in FIG. 1). The range of rotations about the axes 102, 104 can vary depending on, for example, the purpose, scope, and suitable level of redundancy in expanding the native field of detection 103.

Figure 4:
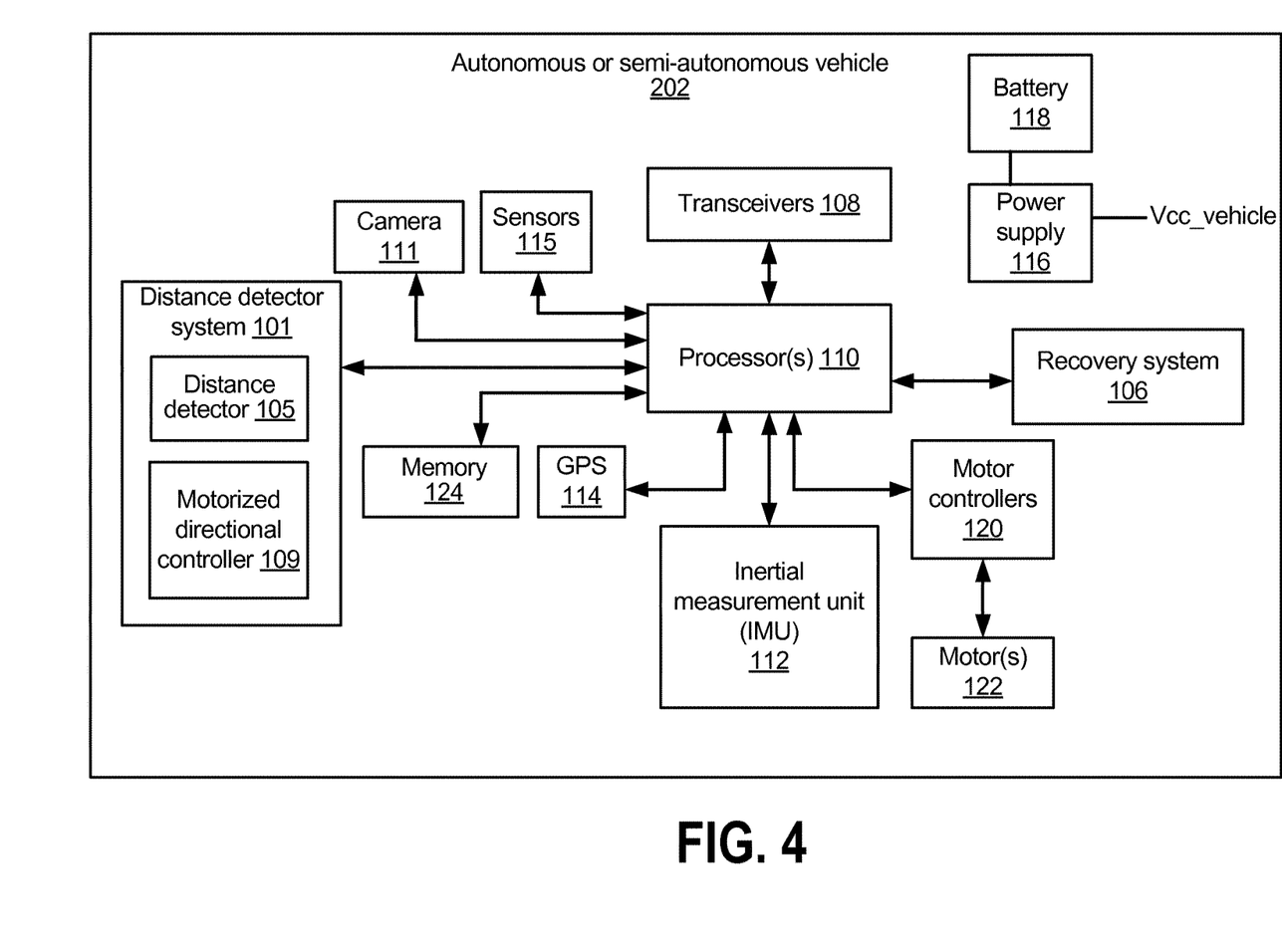
FIG. 4 is a block diagram of an unmanned aerial vehicle according to one embodiment.

The angle of orientation about the axes 102 and 104 at a given moment can each be measured at each hub by one or more sensors (e.g., optical encoder or angle sensors, such as Hall effect sensors or magneto-resistive sensors in combination with a dipole or ring magnet, etc.) and can be communicated to a processor 110 (FIG. 4). In some embodiments, the sensors, motors, and motor controllers of the distance detector system 101 can be dedicated sensors (not shown), motors (not shown), and motor controllers (not shown) specific to the distance detector system 101. In other embodiments, one or more of the sensors, motors, and motor controllers in the distance detector system 101 can be at least partially integrated with sensors 115 (FIG. 4), motors 112 (FIG. 4), and motor controllers 120 (FIG. 4) configured to function with other parts of an autonomous vehicle 202 (FIG. 4).

In other embodiments, the directional controller 109 can be motorless and implemented without dedicated motors controlling the added degrees of freedom discussed above. In some embodiments, the directional controller 109 can be implemented with other mechanical systems, such as one or more ball and socket joints, hinges, gears, chain, belts, pulleys, or other mechanical couplings, to otherwise add additional directional dimensions to the distance detector 105, or to expand the scope of coverage of the distance detector 105. Also, in some embodiments, the added additional degrees of freedom can be more or less depending on the native scope of the distance detector 105 (e.g., the field of detection 103). For example, the distance detector 105 can be a two-dimensional LIDAR, and the directional controller 109 may only provide one additional rotational degree of freedom. In other embodiments, the distance detector 105 can be a two- or three-dimensional LIDAR having a limited scope or breath of distance detection (e.g., incomplete circumference or sphere), and one or more degrees of freedom about the additional axes (e.g., 102, 104) can be added with the directional controller 109 to expand upon the scope of distance detection (e.g., the field of detection 103) native to the distance detector 105. In other embodiments, the directional controller 109 can be implemented to provide additional one or more translational degrees of freedom (e.g., x, y, z, r, or any linear combination thereof) in addition to or instead of the rotational degrees of freedom, for example, to address mechanical blockage in the field of detection 103, or for ease of stowage of all or part of the distance detector system 101. In some embodiments, the added degrees of freedom can be orthogonal, or fully independent, to each other and to the native field of detection (e.g., 103) for efficiency, but in other embodiments, the added degrees of freedom can be at least partially overlapping or redundant or not fully independent or orthogonal, depending on, for example, the physical constraints of the autonomous vehicle 202 and the purpose of the added degrees of freedom. Example embodiments of mechanical integration of the distance detector system 101 and the autonomous vehicle 202 (FIG. 2) are further discussed in connection with FIG. 2 below.

Figure 2:
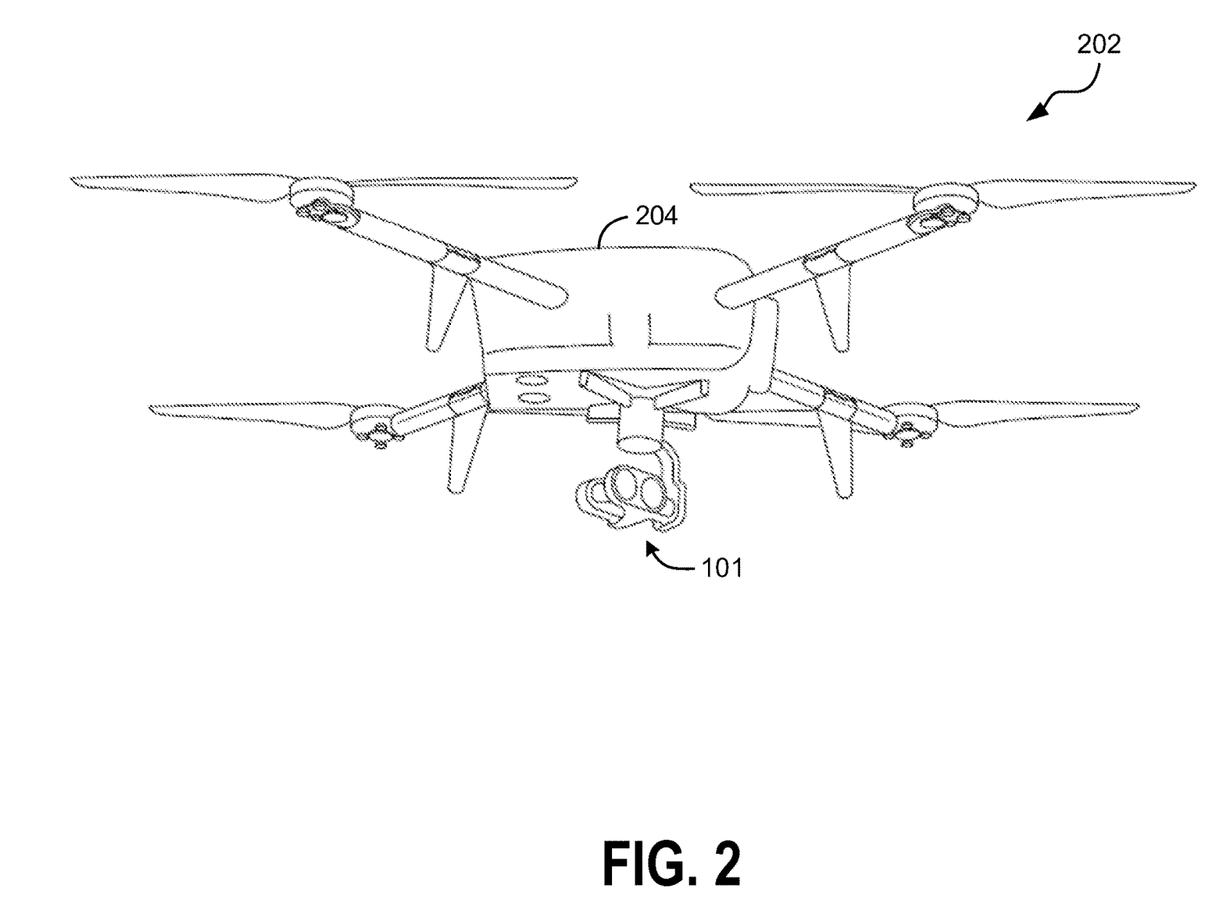
FIG. 2 is an illustration of an unmanned aerial vehicle having a distance detector system according to one embodiment.

In some instances, the directional controller 109 can be configured to rotate the distance detector 105 at a constant speed in at least one direction, and in other instances the directional controller 109 can be configured to rotate the distance detector 105 in a directed, targeted, and non-constant manner that is integrated with execution of a mission or the status of the autonomous vehicle 202 (FIG. 2). For example, in some implementations, the directional controller 109 can be configured to rotate the distance detector 105 about the first axis 102 constantly at about 3 Hz (i.e., three full-360° rotations in $\phi$ per second) for an unmanned aerial vehicle moving at about 10 m/s or less. The directional controller 109 can be further configured to rotate the distance detector 105 about the second axis 104 back and forth depending on the area of interest as the unmanned aerial vehicle operates (e.g., 90°±Δθ with Δθ being a small angle such as 5° if interested in detecting the surroundings at level with the vehicle altitude). Rotating about the axis 102 at a constant speed while slightly varying the angle (e.g., $\theta$) about the axis 104 allows sensing and data collection of a three dimensional space of a partial sphere around the vehicle. For example, if the directional controller 109 rotates the distance detector 105 at 3 Hz and varies θ to three values (e.g., 85°, 90°, and 95°), the data from the partial cone space defined by the location of the distance detector 105 and the range of θ are gathered three times per second. The angle of interest in θ can be different depending on, for example, relative altitudes of the vehicle 202 at its current location and the direction to which it is traveling (e.g., if traveling to a higher altitude, θ can be less than 90°; if traveling to a lower altitude, θ can be greater than) 90°. Also, the variation of angle of rotation about the second axis 104 (e.g., ±Δθ or any other range of θ which is not necessarily symmetric about the angle based on the relative altitudes), and the number of datapoints to gather at a given ϕ and a range of θ can be determined based on the speed and/or status of the vehicle 202, the objective of the data collection, detection of obstacle(s), electromechanical constraints of the vehicle 202, or any other suitable parameters or conditions.

In other embodiments, the unmanned aerial vehicle may travel at a faster or slower speed than the example discussed above, and the directional controller 109 can be configured to rotate or move the distance detector 105 at a higher or lower speed as appropriate. The appropriate speed (or frequency) of the rotation can also depend on, for example, mechanical constraints within the motorized directional controller 109, such as speed tolerance of the slip ring of the motor. In some embodiments, the directional controller 109 can be configured to enable and disable, start and stop, or accelerate and decelerate rotation or movements of the distance detector 105 depending on, for example, mission objectives, mission stage (e.g., takeoff, travel, landing), emergency situations, environmental conditions, power level, duration of the mission, etc. Example operations of the distance detector system 101 are further discussed in connection with FIG. 3 below.

It can be advantageous to implement the distance detector system 101 to augment or expand upon the native scope (e.g., the line of detection 103) of the distance detector (e.g., 105) since the added degrees of freedom by the directional controller 109 may allow effective and efficient implementation of the distance detector system 101 with reduced weight, cost, or complexity associated with a more comprehensive or exhaustive distance detector (e.g., three-dimensional LIDAR with full spherical scope of detection). Furthermore, it can be advantageous to implement the distance detector system 101 as described herein since the system 101 can take advantage of high precision distance sensing of a limited scope distance detector, such as a one-dimensional LIDAR (as opposed to an ultrasound sensor), without suffering from the disadvantage of its limited scope. For instance, the internal mechanisms of a two-dimensional LIDAR may operate by spreading out transmission power over a larger area, which may render outdoor performance and range worse than a one-dimensional LIDAR at a given point in space, and a high-precision one-dimensional LIDAR rotated as needed can provide more advantages in performance over a standalone two-dimensional LIDAR. In some embodiments, the distance detector system 101 as disclosed herein can achieve the resolution of, for example, 1 cm+/−in detecting the location of one or more objects in the relevant partial space surrounding the vehicle 202 during takeoff, travel, and landing with a cost-effective, lightweight one-dimensional LIDAR. As further described below in connection with FIG. 4, in some embodiments, data collected from the distance detector 105 can be stored in a data structure involving variable resolution (e.g., resolution as low as 1 m) regardless of the full resolution or data collection capabilities of the distance detector 105 in order to improve efficiency in computation, memory, processing time, etc. As described herein, the distance detector system 101 allows detection, collection, and sensing operations of the distance detector 105 to be efficient and highly integrated with the status and operation of the vehicle 202 (FIGS. 2-4) in contrast to an unmanned aerial vehicle equipped with a more comprehensive distance detector and without a directional controller (e.g., 109) performing nondiscriminatory or rote data collection operations. Also, even for the distance detector system 101 implemented with a more comprehensive distance detector, the added degrees of freedom using the directional controller 109 can provide better integration between the distance detector system 101 and the autonomous vehicle 202, allow targeted or tailored scope of detection, and compensate for inherent limits of the distance detector or physical limits of the unmanned aerial vehicle.

FIG. 2 is an illustration of an unmanned aerial vehicle having a distance detector system according to one embodiment. FIG. 2 shows the autonomous or semi-autonomous vehicle 202 having the distance detector system 101 mounted on the bottom of a main body 204 of the vehicle 202. In other embodiments, one or more of the distance detector system 101 can be mounted on other parts of the main body 204, such as the top or the side(s), or the distance detector system 101 can be otherwise attached to, coupled to, or incorporated into the vehicle 202 as part of the vehicle 202. In some embodiments, for example, the distance detector system 101 can be at least partly internal to the main body 204 and/or configured to be at least partially stowed in and unstowed from the main body 204.

In some embodiments, the autonomous or semi-autonomous vehicle 202 can be an unmanned aerial vehicle (UAV), and in other embodiments the vehicle 202 can be a terrestrial or part-terrestrial, part-aerial, and/or amphibious vehicle operating autonomously or semi-autonomously. Although the illustrated vehicle 202 in FIGS. 2-3 is a quadcopter having four arms with their respective rotors, the disclosure herein can be implemented in other types of autonomous or semi-autonomous aerial and/or terrestrial vehicles such as a multirotor helicopter having a different number of arms and/or rotors, an aerial vehicle other than a multirotor helicopter such as a fixed wing aerial vehicle, or other types of autonomous or semi-autonomous vehicles such as cars or robots requiring distance detection of the surroundings.

Figure 3:
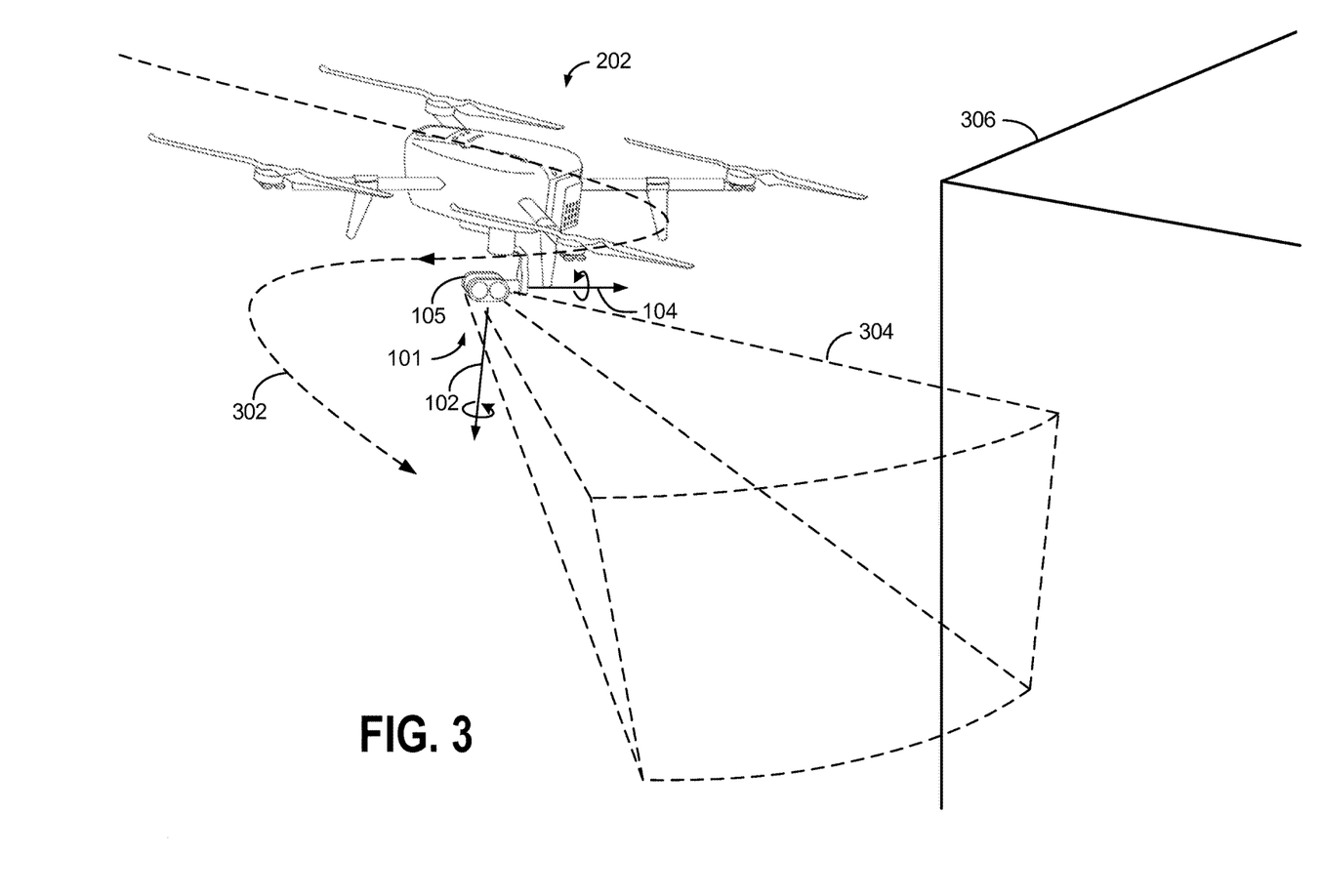
FIG. 3 is an illustration of an example operation of an unmanned aerial vehicle having a distance detector system according to one embodiment.

FIG. 3 is an illustration of an example operation of an unmanned aerial vehicle having a distance detector system according to one embodiment. FIG. 3 shows the vehicle 202 with the distance detector system 101 attached traveling along a travel path 302 based on travel instructions. FIG. 3 also shows an obstacle 306 in the vicinity of the vehicle 202 near or on the travel path 302, and a zone or space of interest 304 for navigation by the vehicle 202. In some embodiments, the vehicle 202 can determine or be provided with the travel path 302 based on, for example, the overall mission of the travel. As the vehicle travels along the travel path 302, the vehicle 202 may execute current travel instructions, which can be understood as instructions for the vehicle 202 to travel from its current location (e.g., a point on the travel path 302) to immediately following series of locations (e.g., traveling through a series of points on the travel path 302) for a certain duration of time and/or distance in space. For example, one or more travel instructions to follow a part of the travel path 302 from the current position of the vehicle 202 to a point on the travel path 302 the vehicle 202 is instructed or expected to be in the next few seconds (e.g., 3 seconds) can constitute current travel instructions. In some instances, the travel path 302 can be predetermined, and the vehicle 202 may be provided with an a priori knowledge of the full expected travel path, and in other instances, the travel path 302 can be determined as the travel occurs on a case-by-case or ad hoc basis. In some instances, the travel path 302 can be tentatively pre-computed based on the real time information gathered by the vehicle 202 or the status of the vehicle 202, and the vehicle 202 can be configured to obtain, determine, and/or adjust its travel path based on the combination of known or predetermined information and on-going gathering of data.

This short forward-looking time or distance can be understood as a clearance time or distance for the vehicle 202 to detect obstructions, if any, along the short expected path of travel. For instance, the illustrated example in FIG. 3 shows that the vehicle 202 plans to turn around soon as it travels along the travel path 302, which may have been preplanned before the start of the mission. To determine whether the vehicle 202 can travel as planned without encountering an obstacle, for example, the distance detector system 101 can orient the distance detector 105 by rotating the distance detector 105 about the axes 102, 104 in a manner discussed above in connection with FIG. 1 to observe the space of interest 304 around the planned travel path 302 before the vehicle 202 reaches the space of interest 304. In the illustrated example, using the distance detector system 101, the vehicle 202 could identify that there is the obstacle 306 partially blocking the space of interest 304 and may determine whether it should revise or alter the travel path 302.

In some embodiments, the distance detector system 101 may be observing ahead of the vehicle 202 along the travel path 302 by a few seconds or a few meters in accordance with current travel instructions. For example, before the vehicle 202 takes off, the distance detector system 101 may have the distance detector 105 pointed to the direction of the takeoff so that the vehicle 202 can determine that its takeoff space is clear of obstacles. As the vehicle 202 takes off the distance detector system 101 can continue to observe its travel path ahead of the vehicle 202 throughout the travel, which can be completed with a landing. The duration and/or distance of advanced observation can be determined based, for example, on the speed of the vehicle 202, the unexpected nature of the environment, sensing of changes in the environment, detection of target object(s), emergency situation(s), or any combination thereof. For example, if the vehicle 202 is traveling along an irregular, less predictable, or unknown terrain, the vehicle 202 may travel at a slower speed and use a shorter clearance time than it would otherwise. Similarly, if the environment the vehicle 202 is traveling includes one or more animate objects (e.g., other vehicles, animals, etc.), the vehicle 202 may travel at a slower speed and use a shorter clearance time than it would otherwise as sudden change or movements by the animate objects can create unexpected obstructions to the vehicle 202. On the other hand, if the vehicle 202 is traveling in a known area or the environment with largely inanimate objects or objects with predictable or slow movements, the vehicle 202 may travel faster and the length of the clearance time or distance may not be as critical for its travel.

In some embodiments, the vehicle 202 can also or alternatively look ahead based on detected objects or surroundings or the mission objectives. For example, in some instances, the vehicle 202 may be provided with a high-level mission without detailed specifications as to the travel path 302 (i.e., lacking a priori knowledge at least in part). In such instances, the vehicle 202 may constantly detect its surroundings a short time or distance ahead to ensure a clear path of travel as the vehicle 202 performs its mission. Even for travels involving a predetermined travel path, the vehicle 202 nonetheless may in part engage in on-the-fly determination of its own path in various situations, such as emergency, sudden encountering of unexpected obstructions, etc., until the vehicle 202 gets situated in a better known environment, for example.

In some instances, as the vehicle 202 performs its mission, the vehicle 202 may follow along a wall at a certain distance, either for guidance (i.e., path planning) or for a specific objective (e.g., identify defects of the wall). As the vehicle 202 follows the wall in this example, the vehicle 202 may look ahead along the tangent lines of the surface of the wall to detect if there are any obstructions on or near the wall or any protrusions from the wall. Similarly, the vehicle 202 may detect other objects in the surroundings and look ahead based on detected edges, corners, surfaces or other features of the objects either to avoid, follow side-by-side, or perform other functions. The vehicle 202 may perform tangent-line look ahead based on the physical or geometric features of the objects according to, for example, statistical estimation, modeling, extrapolation, or other similar mechanisms to determine in what direction the distance detector system 101 should be configured to detect as the vehicle 202 travels along the surfaces.

In certain instances, the vehicle 202 may store, compare, and/or otherwise process distance data that may or may not be on its path forward using the distance detector system 101. For example, in some cases, the vehicle 202 may not only gather distance data in the direction of takeoff and the travel path, but also the area below the vehicle 202 as it takes off from ground if, for instance, the vehicle 202 plans to return to the same spot for landing. The vehicle 202 may store the distance data around the planned landing or return area gathered during takeoff, and the stored distance data information can be compared with the forward looking (i.e., along the travel path) distance data as the vehicle 202 prepares to land upon completion of a mission, for example. Based on storage, processing, and comparison of the distance data, the vehicle 202 may determine the change of environment, appearance or movements of objects, and other relevant distance information along a timeline, in order to, for example, avoid obstacles, alter its course, abort or delay landing, and find a safe and flat landing spot.

In some embodiments, the vehicle 202 may be configured to collect distance data as payload data for various purposes. For instance, the vehicle 202 may travel for the specific purpose of gathering distance information with respect to the terrains, environment, or a particular object. In some instances, the vehicle 202 can use distance data not only to clear or plan its travel path, but also to locate itself either relatively or absolutely based in part on known or previously detected distance information. For example, the vehicle 202 may travel a closed or narrow space, and the vehicle 202 may be able to locate itself relative to the walls or other boundaries of the closed or narrow space. In another example, the vehicle 202 may gather distance information in relation to objects or terrains of known absolute locations so that the vehicle 202 can determine its absolute location. In other instances, the vehicle 202 can use the distance information gathered using the distance detector system 101 to aid other functionalities or performances, such as magnetometer or other sensor calibration, vehicle state estimation, or emergency landing, that can utilize and benefit from the distance data.

In serving the various exemplary purposes described above, one or more processors (e.g., 110 in FIG. 4) may direct the directional controller 109 (FIGS. 1, 4) of the distance detector system 101 according to direction priorities, such as clearing a travel path, detecting and avoiding obstructions, gathering payload data, spotting an object of interest, locating the vehicle 202 itself, performing targeted sensing objectives, aiding or configuring other vehicle functionalities, etc. for the distance detector 105 as discussed herein. As described above, obstruction avoidance along the travel path can be based on current travel instructions, which may allow the one or more processors to determine and update the direction priorities. As the direction priorities for the distance detector system 101 can be related to other aspects of the vehicle's travel and mission performance (e.g., the status of the vehicle 202), the instructions for the distance detector system 101 can be highly integrated with other instructions. Also, in case the distance detector system 101 serves multiple functionalities (e.g., obstruction avoidance and payload data gathering), the distance detector system 101 in conjunction with the one or more processors can be configured to interleave or alternate between the multiple functionalities as the vehicle 202 travels. In some instances, same distance data can be stored, processed, and serve multiple purposes for a variety of unrelated functionalities. Based on the mission objectives, predetermined or known characteristics of the environment, previously gathered data, predictability of the course of travel, and/or encountering of unexpected or emergency situations, the direction priorities can be determined periodically or aperiodically. For instance, determination of direction priorities, and thus configuring of the directional controller 109 (FIGS. 1, 4) to move or rotate the distance detector 105, can range from a predictable scenario of regular priority updates merely confirming no obstruction along a pre-planned travel path to an unpredictable scenario of interruptive priority updates (e.g., forgoing payload data gathering to plan an emergency travel path).

The disclosed technology provides advantages in utilizing the distance detector 105 in an effective and intelligent manner in addition to the advantages in extending physical scope of detection capabilities described above in connection with FIG. 1. For example, depending on the space of interest and direction priorities, the vehicle 202 may not acquire or process some distance data. The directional controller 109 (FIGS. 1, 4) allows the extended use of the distance detector 105 to be integrated with the execution of various instructions by one or more processors (e.g., 110 in FIG. 4), which in turn allows high efficiency, agility, and responsiveness to high-level processes and determinations performed by the vehicle 202. As such, even a vehicle 202 using a comprehensive distance detector (e.g., three-dimensional LIDAR) can benefit from the disclosure herein as it allows efficient use of the comprehensive distance detector avoiding rote data collection and handling or processing of unnecessary data. As described herein, the added intelligence from the vehicle 202 incorporated into the distance detector system 101 may allow targeted sensing or gathering and efficient storing of the gathered data.

FIG. 4 is a diagram showing components of an example unmanned aerial vehicle according to one embodiment. The vehicle 202 illustrated in FIG. 2 includes one or more processor(s) 110 in communication with a state estimator which may be an inertial measurement unit (IMU) 112. The processor 110 is in further communication with one or more transceivers 108, sensors 115, a camera 111, a global positioning system (GPS) module 114, memory 124, and motor controllers 120, which are in communication with motors 122. The processor 110 is in further communication with the distance detector system 101, which may include the distance detector 105 (e.g., LIDAR), and the directional controller 109 as discussed above in connection with FIGS. 1-3. The vehicle 202 further includes a power supply 116 and a battery 118, which provides power to one or more modules of the vehicle 202, including the processor 110. The transceivers 108 and the GPS module 114 may be in further communication with their respective antennas (not shown). The memory 124 may store one or more of mission instructions, travel instructions, pre-mission routines, payload data, flight data and/or telemetry, settings (e.g., calibration settings), parameters, or other similarly relevant information or data. The vehicle 202 may also include a recovery system 106, which may be in communication with one or more modules in the vehicle 202, including the processor 110. In some embodiments, the recovery system 106 may include a dedicated recovery processor (not shown) in communication with a recovery state estimator (not shown), which may also be an additional IMU (not shown). The vehicle 202 may include additional or intermediate modules, drivers, controllers, circuitries, lines of communication, and/or signals not illustrated in FIG. 4.

The vehicle 202 can perform its regular operation according to instructions executed by the processor 110 to, for example, take a course of action for a mission. The processor 110 can be a microprocessor capable of communicating with various modules illustrated in FIG. 4 executing instructions pre-programmed and/or received during a mission, for example. The processor 110 may receive settings, values, or parameters stored in the memory 124 and data from the sensors 115, the distance detector system 101, the camera 111, the transceivers 108, the GPS module 114, the IMU 112, and the motor controllers 120 to evaluate the status of the vehicle 202 and determine a course of action. The status of the vehicle 202 can be determined based on data received through the sensors 115, the distance detector system 101, and/or preloaded data stored in the memory 124 and accessed by the processor 110. For example, the altitude of the vehicle 202 above ground can be determined by the processor 108 based on a digital elevation model (DEM) of a world elevation map or with a LIDAR (e.g., from the distance detector system 101), a barometer, or ultrasound. In some embodiments, the vehicle 202 may include multiple processors of varying levels of computing power and reliability to execute low-level instructions or run high-level application code or a virtual machine. In such embodiments, one or more of the functionalities of the processor(s) 110 described herein may instead be performed by another processor in the vehicle 202.

The transceivers 108 can be devices capable of transmitting and receiving data to and from a system, device, or module external to the vehicle 202. For example, the transceivers 108 may include radio frequency (RF) transceivers capable of communicating data over a Wi-Fi network or any other suitable network in various frequency bands or channels, such as 900 MHz, 2.4 GHz, 5 GHz, etc. In some embodiments, the transceivers 108 may be implemented with a combination of separate transmitters and receivers. The motor controllers 120 may include a controller device or circuit configured to interface between the processor 110 and the motors 122 for regulating and controlling speed, velocity, torque, or other operational parameters of their respective, coupled motors 122. In some embodiments, one or more motor control schemes, such as a feedback control loop, may be implemented with the processor 110 and/or the motor controllers 120. The motors 122 may include electrical or any other suitable motors coupled to their respective rotors of the vehicle 202 to control their propellers, for example.

The memory 124 can be a memory storage device (e.g., random-access memory, read-only memory, flash memory, or solid state drive (SSD) storage) to store data collected from the sensors 115, data processed in the processor 110, or preloaded data, parameters, or instructions. In some embodiments, the memory 124 may store data gathered from the distance detector 105 using various computationally efficient data structures. For example, in some cases, the distance data from the distance detector 105 can be stored using a three-dimensional occupancy grid mapping, with the gathered data grouped into cube-shaped bins of variable resolution in space. Depending on the need of distance data for the various processes or operations described herein using distance data, the resolution of the occupancy grid can be determined to indicate whether each variable resolution bin within the reach of the distance detector is free or occupied based on the gathered distance data. In some embodiments, the three-dimensional occupancy mapping values can be estimated using probabilistic approaches based on the gathered distance data.

The IMU 112 may include a stand-alone IMU chip containing one or more magnetometers, gyroscopes, accelerometers, and/or barometers. In some embodiments, the IMU 112 may be implemented using a combination of multiple chips or modules configured to perform, for example, measuring of magnetic fields and vehicle orientation and acceleration and to generate related data for further processing with the processor 110. Regardless of integrated or multi-module implementation of the IMU 112, the term "magnetometer" as used herein, generally refers to the part(s) of the IMU 112 responsible for measuring the magnetic field at the location of the vehicle 202. Similarly, the term "accelerometer" as used herein, generally refers to the part(s) of the IMU 112 responsible for measuring acceleration of the vehicle 202, and the term "gyroscope" as used herein, generally refers to the part(s) of the IMU 112 responsible for measuring orientation of the vehicle 202.

The recovery system 106 can be responsible for recovery operation of the vehicle 202 to, for example, safely deploy a parachute and land the vehicle 202. The recovery system 106 may include a parachute (not shown) and an electromechanical deployment mechanism (not shown). The power supply 116 may include circuitry such as voltage regulators with outputs directly powering various modules of the vehicle 202 with Vcc vehicle, and the battery 118 can provide power to the power supply 116. In some embodiments, the battery 118 can be a multi-cell lithium battery or any other suitable battery capable of powering the vehicle 202. In some embodiments, the battery 118 of the vehicle 202 can be removable for easy swapping and charging.

The sensors 115 may include one or more proximity sensors using, for example, infrared, radar, sonar, ultrasound, LIDAR, barometer, and/or optical technology. The sensors 115 may also include other types of sensors gathering data regarding visual fields, auditory signals, and/or environmental conditions (e.g., temperature, humidity, pressure, etc.). The GPS module 114 may include a GPS transceiver and/or a GPS driver configured to receive raw and/or processed GPS data such as ephemerides for further processing within the GPS module 114, with the processor 110, or both. The vehicle 202 may also include a microphone (not shown) to gather audio data. In some embodiments, one or more sensors 115 responsible for gathering data regarding auditory signals can take the place of the microphone.

As described above in connection with FIG. 1 above, the distance detector system 101 can include, among others, the distance detector 105 and the directional controller 109. In some embodiments, the distance detector 105 can include a LIDAR sensor, such as a one-dimensional LIDAR sensor. In some implementations, a one-dimensional LIDAR having, for example, the range of about 50 m with the sampling frequency up to about 30 kHz can be used, and the directional controller 109 providing a two-dimensional gimbal whose rotational frequency about one axis can be at about 2-3 Hz for a vehicle 202 traveling at about 10 m/s or less. In such implementations, the vehicle 202 can gather distance data with an angular resolution of approximately 0.1°, for example. The directional controller 109 can be a motorized directional controller, which includes one or more brushless motors with a slip ring to implement a gimbal system. In other embodiments, the directional controller 109 be otherwise configured to move or rotate the distance detector 105 without embedded motors. In some embodiments, the directional controller 109 may further include drivers such as a controller device or circuit configured to interface between the processor 110 and the motors of the directional controller 109 for regulating and controlling speed, velocity, torque, or other operational parameters of their respective, coupled motors.

The camera 111 can be configured to gather images and/or video. In some embodiments, one or more of the sensors 115 and the distance detector 105 (in conjunction with other modules of the distance detector system 101) responsible for gathering data regarding visual fields can take the place of the camera 111. In some embodiments, the sensors 115, the distance detector 105 (in conjunction with other modules of the distance detector system 101), and/or the camera 111 may be configured to gather parts of payload data, which includes data gathered by the vehicle 202 regarding its surroundings, such as images, video, and/or processed 3D mapping data, gathered for purposes of mission performance and/or delivered to the user for various purposes such as surveillance, observation, progress report, landscape analysis, etc. The sensors 115 may also gather what may be termed telemetry data, which is data regarding the status and activities of the vehicle 202 during the flight such as velocity, position, attitude, temperature, and rotor speeds. Such data may be collected to retain records or logs of flight activity and perform diagnostics. In some embodiments, the sensors 115, the distance detector 105 (in conjunction with other modules of the distance detector system 101), and/or the camera 111 may also be configured to gather data for purposes of aiding navigation and obstruction detection as disclosed herein.

Figure 5:
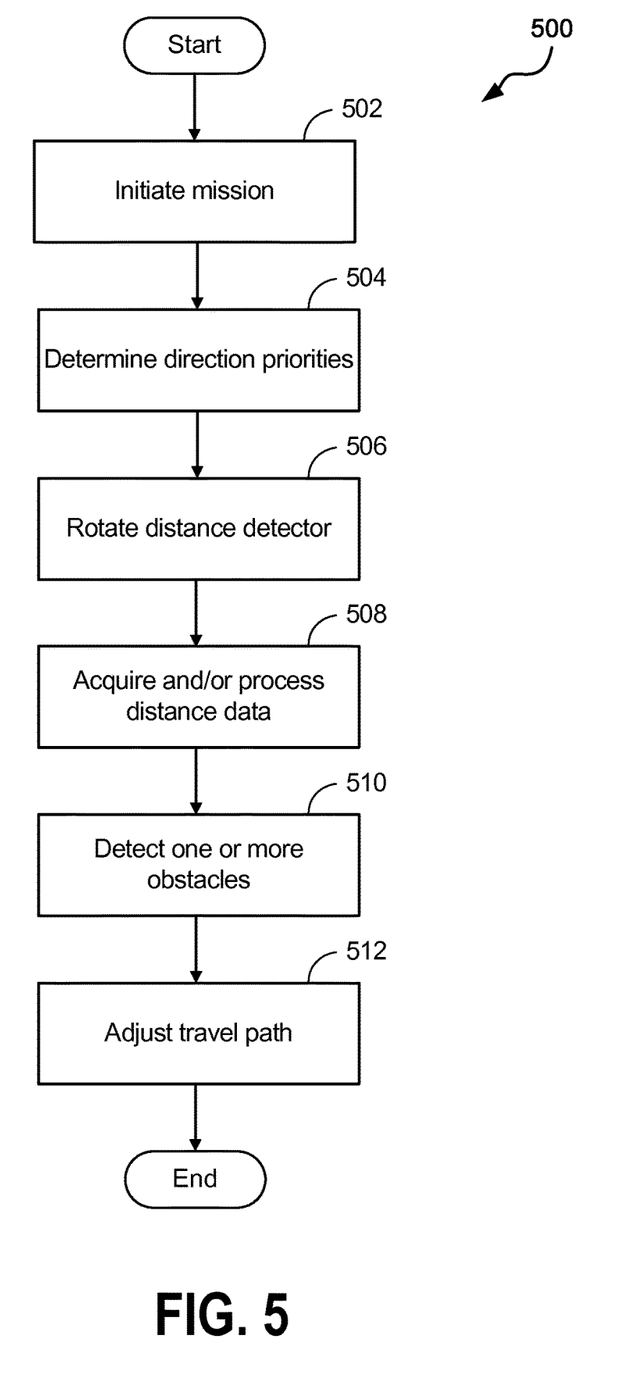
FIG. 5 is a flowchart for enhanced detection according to one embodiment.

FIG. 5 is a flowchart for enhanced detection according to one embodiment. The illustrated process 500 can be performed in part by and/or in conjunction with one or more modules in the vehicle 202 (FIG. 4), such as the processor(s) 110 (FIG. 4), the distance detector system 101 (FIG. 4), the distance detector 105 (FIG. 4), the directional controller 109 (FIG. 4), the sensors 115 (FIG. 4), the camera 111 (FIG. 4), the memory 124 (FIG. 4), the GPS module 114 (FIG. 4), the IMU 112 (FIG. 4), and the motor controllers 120 (FIG. 4). It is to be noted that all or parts of steps 502, 504, 506, 508, 510, and 512 may be concurrently, continuously, periodically, intermittently, repeatedly, or iteratively performed, and the illustrated process in FIG. 5 is only one example embodiment of inventive features disclosed herein. As the vehicle 202 is powered up, the process 500 may proceed to step 502.

In step 502, the vehicle 202 initiates its mission. As discussed above, the mission can include high-level objectives, a predetermined travel path, and/or distance-specific instructions (e.g., follow a wall at a certain offset distance). Also as discussed above, as the vehicle 202 prepares to take off and continues to travel, current travel instructions can be continually determined and executed for a short window of time or distance ahead.

In step 504, one or more processors 110 of the vehicle 202 determines direction priorities based at least in part of the current travel instructions. The current travel instructions may encompass a short path along the planned travel path of the vehicle, and the distance detector system 101 of the vehicle 202 may, for example, determine whether, how, and to what extent the distance detector 105 gathers distance data regarding the vehicle's expected path forward and/or its surroundings. As discussed above, in certain instances, the direction priorities can be further based on other mission objectives (e.g., payload data gathering, locating the vehicle 202 relative to its surroundings) or unanticipated situations the vehicle 202 may encounter.

In step 506, the directional controller 109 of the vehicle 202 rotates distance detector 105 about first and second axes. As discussed above, the directional controller 109 may include motors to implement a motorized gimbal system that may extend the detection dimension of the distance detector 105.

In step 508, the one or more processors 110 of the vehicle 202 acquire and/or process the distance data from the distance detector 105 based at least in part on the direction priorities determined in step 504. The direction priorities may, for example, indicate that the vehicle 202 should confirm the travel path up to 5 seconds ahead should be clear of obstacles while the distance detector system 101 gathers intermittent distance data to the ground as the vehicle 202 travels. As the current travel instructions and direction priorities get updated as the vehicle 202 travels, steps 504, 506, and 508 may be repeated throughout the mission.

In step 510, the vehicle 202 may optionally detect one or more obstacles with the distance detector 105 in a direction based in part on the direction priorities in step 504. In some embodiments, the distance detector 105 may gather data according to direction priorities to determine whether there are obstacles, and the processor 110 may determine that there is an obstacle on or near the vehicle's immediate travel path based on the distance data.

In step 512, the vehicle 202 may optionally adjust its travel path. For example, in case an obstruction is detected on or near the vehicle's planned travel path, the one or more processors 110 may determine that the obstruction would hinder the vehicle's travel as planned and determine that its travel path be adjusted. Upon the determination of path adjustment, the distance detector system 101 may further gather distance data of the vehicle's surroundings to find an alternative path to travel. In some embodiments, the vehicle 202 may constantly plan and/or adjust its path forward based on constant gathering of distance data of its surroundings. In other embodiments, the vehicle 202 may determine an alternative path forward, store the alternative path, and perform obstacle clearing steps similar to steps 504, 506, and 508 along the alternative path. The process 500 in FIG. 5 only shows one iteration of the process that can be performed by the vehicle 202, and in some embodiments, parts of the process 500 may repeat in an iterative loop. For example, after performing step 512, the process may loop back to step 504, and the vehicle 202 may determine direction priorities and proceed to steps 506, 508, 510, and 512. In such example, the process performed by the vehicle 202 may repeatedly loop back from step 512 to step 504 until, for instance, the vehicle 202 completes its mission.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the Figures depict example arrangements of elements and components, additional intervening elements, devices, features, or components may be present in an actual embodiment (assuming that the functionality of the depicted circuits is not adversely affected).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the implementations are not limited to the precise configuration and components illustrated above. Various modifications, changes and variations may be made in the arrangement, operation and details of the methods and apparatus described above without departing from the scope of the implementations.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well.

What is claimed is:

1. An unmanned aerial vehicle comprising:
   a distance detector system comprising at least a distance detector and a directional controller coupled to the distance detector; and
   one or more processors configured to:
   receive travel instructions, wherein the travel instructions consist of instructions for the unmanned aerial vehicle to travel from its current location to at least one other location;
   determine direction priorities for the distance detector system based at least in part on the travel instructions;
   designate a space of interest for navigation by the unmanned aerial vehicle based at least in part on the travel instructions;
   receive distance data generated by the distance detector system concerning at least the space of interest;
   store the distance data generated by the distance detector system in a variable resolution data structure;
   process the distance data generated by the distance detector system based at least in part on the determined direction priorities; and
   execute a travel path for traveling to the at least one other location based at least in part on the travel instructions and the distance data.

2. The unmanned aerial vehicle of claim 1, wherein the directional controller is configured to rotate the distance detector about a first axis and a second axis.

3. The system of claim 2, wherein the one or more processors are configured to control the directional controller to rotate the distance detector about the first and second axes in a targeted manner such that the distance detector system collects data regarding the space of interest.

4. The unmanned aerial vehicle of claim 1, wherein the one or more processors are configured to control the directional controller to rotate the distance detector about at least one of the first and second axes based at least in part on the determined direction priorities.

5. The unmanned aerial vehicle of claim 1, wherein the one or more processors are configured to determine the direction priorities further based in part on payload data gathering.

6. The unmanned aerial vehicle of claim 1, wherein the one or more processors determine the direction priorities periodically or aperiodically during the mission.

7. The unmanned aerial vehicle of claim 1, wherein the distance detector comprises a one-dimensional LIDAR.

8. The unmanned aerial vehicle of claim 7, wherein the directional controller is a gimbal system having at least two motors.

9. The unmanned aerial vehicle of claim 1, wherein the distance detector comprises a two- or three-dimensional LIDAR.

10. The unmanned aerial vehicle of claim 1, wherein the one or more processors are configured not to process distance data generated by the distance detector in a defined direction during the mission based at least in part on the determined direction priorities.

11. The unmanned aerial vehicle of claim 1, wherein the one or more processors are configured to collect payload data based at least in part on the location of the unmanned aerial vehicle.

12. The unmanned aerial vehicle of claim 11, wherein the directional controller is configured to rotate the distance detector about a first axis at a constant rate.

13. The unmanned aerial vehicle of claim 1, wherein the distance detector is configured to detect one or more obstacles in a direction defined at least in part by the determined direction priorities.

14. The unmanned aerial vehicle of claim 13, wherein the unmanned aerial vehicle is configured to adjust a flight path for the mission based at least in part on the detection of the one or more obstacles.

15. The system of claim 1, wherein the variable resolution data structure is a three-dimensional occupancy grid mapping, with the gathered data grouped into cube-shaped bins of variable resolution in space.

16. A method for enhanced sensing for an unmanned aerial vehicle, the method comprising:
   receiving travel instructions, wherein the travel instructions consist of instructions for the unmanned aerial vehicle to travel from its current location to at least one other location
   determining direction priorities based at least in part on current travel instructions;
   designating a space of interest for navigation by the unmanned aerial vehicle based at least in part on the travel instructions;
   controlling an orientation of a distance detector;
   receiving distance data generated by the distance detector system concerning at least the space of interest;
   storing the distance data generated by the distance detector system in a variable resolution data structure;
   processing the distance data generated by the distance detector system based at least in part on the determined direction priorities; and
   execute a travel path for traveling to the at least one other location based at least in part on the travel instructions and the distance data.

17. The method of claim 16, wherein the controlling the orientation of the distance detector comprises rotating the distance detector about a first axis and a second axis.

18. The method of claim 17, wherein the distance detector is rotated about the first axis and a second axis in a targeted manner such that the distance detector system collects data regarding the space of interest.

19. The method of claim 16, wherein the determining direction priorities is further based in part on payload data gathering.

20. The method of claim 16, wherein the direction priorities are updated periodically or aperiodically during the mission.

21. The method of claim 16, wherein the distance detector comprises a one-dimensional LIDAR.

22. The method of claim 16, wherein the distance detector comprises a two- or three-dimensional LIDAR.

23. The method of claim 16, wherein the rotating the distance detector comprises rotating the distance detector about the first axis at a constant rate.

24. The method of claim 16, wherein the acquiring and/or processing the distance data comprises not processing distance data generated by the distance detector in a defined direction during the mission based at least in part on the determined direction priorities.

25. The method of claim 16 further comprising:
  detecting one or more obstacles with the distance detector in a direction defined at least in part by the determined direction priorities; and
  adjusting a travel path for the mission based at least in part on the detecting of the one or more obstacles.

26. The method of claim 16, wherein the variable resolution data structure is a three-dimensional occupancy grid mapping, with the gathered data grouped into cube-shaped bins of variable resolution in space.

* * * * *